US012639433B2

(12) United States Patent
Brand et al.

(10) Patent No.:  US 12,639,433 B2
(45) Date of Patent:  May 26, 2026

(54) BEHAVIORAL DETECTION OF MALWARE THAT PERFORMS FILE OPERATIONS AT A SERVER COMPUTER

(71) Applicant: CTERA Networks Ltd., Petah-Tikva (IL)

(72) Inventors: Aron Brand, Hod Hasharon (IL); Doron Sher, Kfar Yona (IL); Simon Taib, Givatayim (IL)

(73) Assignee: CTERA Networks Ltd., Petah-Tikva (IL)

( * ) Notice: Subject to any disclaimer, the term of this patent is extended or adjusted under 35 U.S.C. 154(b) by 161 days.

(21) Appl. No.: 18/345,617

(22) Filed: Jun. 30, 2023

(65) Prior Publication Data

US 2025/0005153 A1     Jan. 2, 2025

(51) Int. Cl.
*G06F 21/56*          (2013.01)
*G06F 21/55*          (2013.01)

(52) U.S. Cl.
CPC .......... *G06F 21/565* (2013.01); *G06F 21/552* (2013.01)

(58) Field of Classification Search
CPC ............................. G06F 21/552; G06F 21/565
See application file for complete search history.

(56)               References Cited

U.S. PATENT DOCUMENTS

| | | | | |
|---|---|---|---|---|
| 7,774,322 | B2 * | 8/2010 | Davis ...................... | G06F 16/16 707/821 |
| 11,775,762 | B1 * | 10/2023 | Mason ................ | G06F 16/3347 704/9 |
| 11,777,970 | B1 * | 10/2023 | Wainer ................... | G06N 20/00 726/23 |
| 2016/0285711 | A1 * | 9/2016 | Akidau ................... | H04L 47/28 |
| 2019/0026466 | A1 * | 1/2019 | Krasser .................... | G06N 7/01 |
| 2019/0171816 | A1 * | 6/2019 | Copty ................... | G06N 20/00 |
| 2019/0230098 | A1 * | 7/2019 | Navarro ............. | H04L 63/1433 |
| 2020/0210430 | A1 * | 7/2020 | Shen ...................... | G06F 16/221 |
| 2021/0266340 | A1 * | 8/2021 | Grounds ............. | H04L 63/1433 |
| 2021/0285923 | A1 * | 9/2021 | Gahroosi ........... | G01N 33/0004 |
| 2022/0180247 | A1 * | 6/2022 | Chow ................... | G06N 20/00 |
| 2023/0138151 | A1 * | 5/2023 | Varley .................. | G06F 16/338 707/740 |
| 2024/0364711 | A1 * | 10/2024 | Gaman ................... | G06F 21/56 |

* cited by examiner

*Primary Examiner* — Techane Gergiso
*Assistant Examiner* — Jacob Benedict Knackstedt
(74) *Attorney, Agent, or Firm* — M&B IP Analysts, LLC

(57)               ABSTRACT

A method for protecting against malware when a client computer causes file operations at a server computer, comprising: gathering, by the server computer, information for each file operation performed into an event, the information including at least a identifier and a type of the operation, developing, not by the client computer, an event-level feature vector including at least two features which are numerical data representing an aspect of the gathered information for each event; grouping the event-level feature vectors into a file-level feature vector for each file; supplying, not by the client computer, the file-level feature vectors to a trained machine learning classifier and receiving as an output of the classifier at least one risk score indicating a likelihood of a presence of malware activity; and when malware activity is indicated by an aggregate risk score based on the at least one risk score, initiating incident handling.

18 Claims, 3 Drawing Sheets

200

S210 Group events into sessions

S220 Derive an event-level feature vector for every event that occurs within a time window S230 Derive file-level feature vector S240 Predict risk score per file S250 Calculate a risk score for each session S260 Initiate incident handling action when risk score is above a threshold

BEHAVIORAL DETECTION OF MALWARE THAT PERFORMS FILE OPERATIONS AT A SERVER COMPUTER

TECHNICAL FIELD

This invention relates to cybersecurity, and more specifically, to behavior-based detection of ransomware.

BACKGROUND

Ransomware is a form of malware that encrypts a victim's files and demands payment of a ransom in exchange for the decryption key so that the data may be restored to the victim. Given the significant damage that this malicious software can inflict on individuals and organizations, detecting it as early as possible is crucial.

Existing security systems rely on the installation of agent software on a client to monitor system calls, system registry access, network communication to command-and-control servers, and other client-side activities related to malware in order to detect the operation of ransomware on the client device. Such existing security systems typically employ traditional pattern and signature-based methods. Other existing solutions rely on content analysis of files to identify encryption or write honeypot files to detect undesirable file changes, or they may examine the entire payload of file write operations to calculate information entropy.

Ransomware writers are known to use various tactics to avoid detection by such security systems. As an example, one tactic employed by ransomware writers is the use of common and innocuous file extensions, such as '.mp3' or '.doc', to disguise a malicious payload. By using file extensions that are commonly associated with benign files, ransomware writers can evade detection by such pattern and signature-based security systems.

Given that new strains of malware are created daily, relying on fixed patterns and signatures or other content analysis to detect malware is ineffective.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

One embodiment disclosed herein includes a method for protecting against malware that performs file operations at a server computer in a system having a client computer and the server computer, the client computer causing file operations to be performed at the server computer. The method comprises: gathering, by the server computer, information for each file operation into an event, the gathered information including, at least an identifier of a file on which the file operation was performed and a type of the file operation performed on the file; developing, not by the client computer, an event-level feature vector for each event, each of the event-level feature vectors including at least two features, each of the features in each of the event-level feature vectors being numerical data representing an aspect of the gathered information for each event; grouping the event-level feature vectors by at least one identifier of a file and deriving a file-level feature vector for every unique file that is indicated within the event level feature vectors; supplying, not by the client computer, the file-level feature vectors to a trained machine learning classifier and receiving as an output of the classifier at least one risk score, each risk score indicating a likelihood of a presence of malware activity; and when there is a likelihood of malware activity being present which is indicated by an aggregate risk score exceeding a threshold, the aggregate risk score being based on the at least one risk score output by the classifier, initiating incident handling.

One embodiment disclosed herein includes an arrangement for protecting against malware that performs file operations at a server computer in a system having a client computer and the server computer, the client computer causing file operations to be performed at the server computer, wherein the server computer gathers information for each file operation into an event, the gathered information including, at least an identifier of a file on which the file operation was performed and a type of the file operation performed on the file, comprising: a processing circuitry; and a memory, the memory containing instructions that, when executed by the processing circuitry, configure the system to: develop an event-level feature vector for each event, each of the event-level feature vectors including at least two features, each of the features in each of the event-level feature vectors being numerical data representing an aspect of the gathered information for each event; group the event-level feature vectors by at least one identifier of a file and derive a file-level feature vector for every unique file that is indicated within the event-level feature vectors; supply the file-level feature vectors to a trained machine learning classifier and receiving as an output of the classifier at least one risk score, each risk score indicating a likelihood of a presence of malware activity; and when there is a likelihood of malware activity being present which is indicated by an aggregate risk score exceeding a threshold, the aggregate risk score being based on the at least one risk score output by the classifier, initiate incident handling.

One embodiment disclosed herein includes a non-transitory computer readable medium having stored thereon instructions for causing a processing circuitry to perform a process for protecting against malware that performs file operations at a server computer in a system having a client computer and the server computer, the client computer causing file operations to be performed at the server computer, wherein the server computer gathers information for each file operation into an event, the gathered information including, at least an identifier of a file on which the file operation was performed and a type of the file operation performed on the file, the process comprising: developing, not by the client computer, an event-level feature vector for each event, each of the event-level feature vectors including at least two features, each of the features in each of the event-level feature vectors being numerical data representing an aspect of the gathered information for each event; grouping the event-level feature vectors by at least one identifier of a file and deriving a file-level feature vector for every unique file that is indicated within the event-level feature vectors; supplying, not by the client computer, the file-level feature vectors to a trained machine learning classifier and receiving as an output of the classifier at least one risk score, each risk score indicating a likelihood of a presence of malware activity; and when there is a likelihood of malware activity being present which is indicated by an aggregate risk score exceeding a threshold, the aggregate risk score being based on the at least one risk score output by the classifier, initiating incident handling.

DETAILED DESCRIPTION

Figure 1:
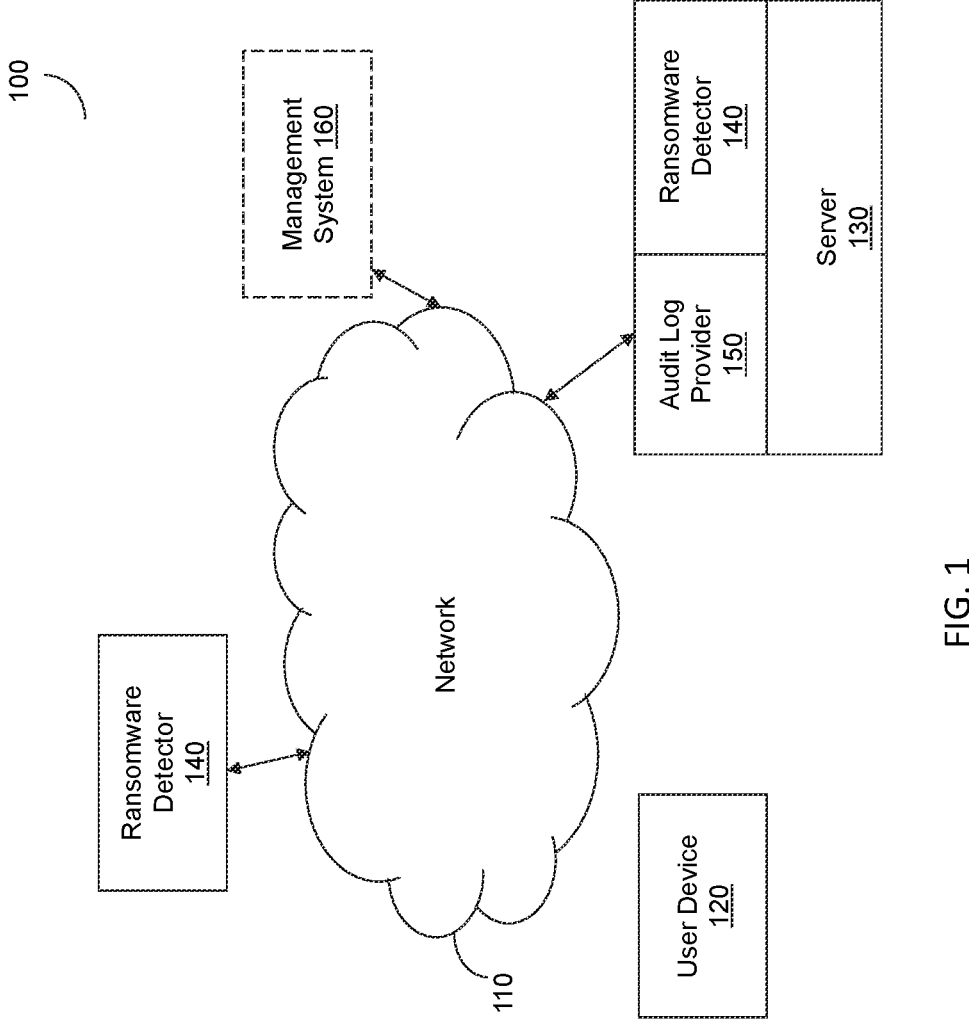
FIG. 1 shows an illustrative system for detecting ransomware and taking an action in response to detection of ransomware.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Note that although the subject matter disclosed herein is couched in terms of ransomware for pedagogical purposes, it should be appreciated that the disclosed techniques are not limited to detecting only this specific type of malware. Rather, the techniques disclosed herein may be used to detect other types of malware or malicious activity, such as viruses, trojans, or malicious file activity performed by humans on a storage device. In particular, the techniques are applicable to the protecting against malware that performs file operations at a server computer in a system having a client computer and the server computer, where in normal operation the client computer causes file operations to be performed at the server computer but during an attack by the malware the malware causes file operations to be performed at the server computer.

The difficulties with detecting ransomware indicated hereinabove are avoided, in accordance with the principles of the disclosure, by a clientless approach to detecting ransomware and other security incidents nearly in real-time, i.e., within seconds of the attack beginning, by analyzing the file events in a computer system. Advantageously, by being performed in nearly-real-time, the number of impacted files is limited. This clientless approach employs a behavioral approach to detecting ransomware that does not rely on traditional pattern and signature-based methods. More specifically, rather than being required to be performed at a client device, the behavior-based detection of ransomware may be performed by a computer system, for example, a file server or a network-attached storage (NAS) device employing network file protocols like Server Message Block (SMB) or Network File System (NFS). By implementing the ransomware detection mechanism on the non-client system, as opposed to individual client devices, advantageously, the detection system is rendered less susceptible to discovery, tampering, or disabling by the ransomware itself. Note that herein, regardless of the fact that a client and the non-client computer system may be implemented on a single computer system, the client and the non-client computer system are treated as separate entities.

The methods disclosed herein employ behavioral analysis at the non-client computer system to detect the basic behavioral traits of ransomware by focusing on the behavior of file access events, also referred to herein as file events or simply events, rather than specific patterns and signatures. File events include operations such as file read, file write, file move, and file delete. The file events may be gleaned from metadata that is available regarding the file operation without requiring access to the data of the file that is the subject of the event. The present disclosure may identify ransomware by reviewing file events in the non-client system, which, in some embodiments, may be without requiring any client-side software. Thus, the arrangements herein never see or interact with the ransomware itself. Rather, all that is seen is what the ransomware is doing, i.e., the effect of the operations of the ransomware.

More specifically, the present method requires only the metadata for events without necessitating read or write access to the file data itself. As a result of not needing access to the data itself, advantageously the amount of data analyzed is relatively minimal. This enables the further advantage that the ransomware detector can be implemented remotely from the client, such as in the cloud, as only a small amount of metadata needs to be transmitted from the server to the ransomware detector for the detection of ransomware.

To this end, there is a gathering of event data and processing the event data to derive numerical characteristics that, with the assistance of a machine-learning classifier, can detect the likelihood of the existence of a malicious user. These numerical characteristics are referred to as features for an event. Further to this end, in some embodiments, use is made of a two-step process. In a first step, event-level features are calculated and the collection of all the features of an event is referred to as an event feature vector. This is followed in a second step by the calculation of file-level numeric features. The collection of all the numeric features of a file is referred to as a file-level feature vector. File level features for a file may be determined by collecting event-level features in the time window for the file as well as generating them specifically for the file, e.g., based on the filename.

Features of the file-level feature vector are selected by the implementer based on their ability to distinguish between ransomware and non-ransomware activity as well as their independence from other features. In machine learning, as is well-known, a feature is a measurable property or characteristic of an object or event that is relevant to a particular problem to be solved. Feature selection is a known area in data science. See, for example, https://en.wikipedia.org/wiki/Feature_selection. As an example, in a machine learning model for predicting house prices, features could include the number of bedrooms, the size of the house in square feet, the age of the house, and the neighborhood the house located in. One of ordinary skill in the art of machine learning will be able to select the relevant features to best distinguish between ransomware and non-ransomware activity. Once the features that are relevant to distinguish between ransomware and non-ransomware activity are selected the machine learning model can then learn to predict based on the selected features whether ransomware is present or not.

Advantageously, in experimental testing, it has been observed that deriving a file-level feature vector in the manner described herein can increase the accuracy of ransomware detection from an F1-score of F1=0.90 to F1=0.97 or higher. A higher F1-score indicates better performance of the classification model in accurately predicting the target variable, therefore, the F1-score is commonly used as a benchmark for evaluating the effectiveness of machine learning models. This represents a significant improvement in the effectiveness of ransomware detection and is highly advantageous for systems that require accurate and reliable detection of ransomware threats with a minimum of false positives. As such, the instant disclosure presents a highly efficient solution for the detection of ransomware, reducing computational resources and network traffic requirements while necessitating no modifications to existing infrastructure. Furthermore, the disclosed method enables detection of future, unanticipated malware strains. In other words, advantageously, the methods disclosed herein provide good protection against new and unknown strains of malware, i.e., so-called zero-day attacks.

This disclosure employs the terms "move" with respect to a file to refer to the process of relocating or renaming a file in the filesystem. Thus, a file that is moved may be placed at a new location in the directory structure and/or with a different name.

For convenience of pedagogical purposes, the term "sliding window" is predominantly employed in this application to denote the technique of analyzing time series data by partitioning it into overlapping intervals of fixed length. However, it should be understood that where sliding window is mentioned that a non-overlapping window, a variable sized window. or other windowing methods may be employed.

FIG. 1 shows an illustrative system 100 for detecting ransomware and taking an action in response to detection of ransomware that includes network 110 which couples user device 120, server 130, ransomware detector 140, and optional management system 160. Also shown are ransomware detector 140 and audit log 150 within server 130.

Network 110 may be, but is not limited to, a wireless, cellular or wired network, a local area network (LAN), a wide area network (WAN), a metro area network (MAN), the Internet, the worldwide web (WWW), similar networks, and any combination thereof. User device (UD) 120 may be, but is not limited to, a personal computer, a laptop, a tablet computer, a smartphone, a wearable computing device, or any other device capable of performing file storage operations over the network 110.

Server 130 is any type of server or computer arranged to provide service to another computer such as UD 120. Server 130 is sometimes referred to in the art as a "filer". Audit log provider 150 within server 130 provides an ordered event log of at least the file storage operations, each event in the event log including at least an event type, at least one file identifier, and at least one identifier of the user or client device performing the operation.

Ransomware detector 140 detects the effects of ransomware when such is installed, e.g., undesirably, on user device 120 so that the data it has stored on server 130 becomes encrypted and subject to ransom for the decryption information. When Ransomware is detected, ransomware detector 140 may take action to prevent or minimize damage from the ransomware. Ransomware detector 140 may be implemented wholly on server 130 itself or may be partially implemented on sever 130 and partially implemented remotely thereto, e.g., in the cloud, hence there are two elements in FIG. 1 labeled ransomware detector 140. No agent is implemented on user device 120.

Optional management system 160 may receive information from ransomware detector 140 and provide it, e.g., in the form of a report or notification, to a user. To this end, optional management system 160 may include or be coupled to an interface console. In some embodiments, management system 160 may receive and process notifications from multiple ones of server 130. Management system 160 may provide a dashboard that supplies one or more administrators with a view of ongoing ransomware incidents.

Figure 2:
FIG. 2 shows a flow chart of an illustrative process for detecting ransomware activity based on a record of file events in accordance with the principles of the disclosure.

FIG. 2 shows a flow chart of an illustrative process for detecting ransomware activity based on a record of file events in accordance with the principles of the disclosure. Such a process may be implemented by ransomware detector 140 of FIG. 1 and has two phases. In the first phase, event level features are determined. In the second phase, file level features are determined. The process continually runs once server 130 becomes operational and begins to process events, i.e., once files are being read, written, moved, and deleted.

Events are segregated, or grouped, by session in S210, e.g., as they are received by ransomware detector 140. A session corresponds to each unique user of server 130. Thus, a session may be, for example, a combination of a username and network address. The temporal ordering of the events of each session is preserved. As indicated above, file events include operations such as file read, file write, file move, and file delete. The file events may be gleaned from metadata that is available regarding the file operation without requiring access to the data of the file that is the subject of the event. Thus, the metadata itself for an event may be, therefore, a representation of an event.

As noted above, an event feature is a numerical value that is derived from the information that characterizes the event. An event may contain strings, such as the path of the file, the filename, and the destination filename. A filename may include the path. Numeric features need to be derived from such strings to be useable by the model. The strings may be used in their entirety, or they may be divided into various substrings. For example, a filename may be divided into path, base name, and extension which may be referred to herein as path components. This may be achieved by parsing filenames observed in events to separate string components such as path, base name, and extension. It should be noted that file move events include reference two filenames: the source, i.e., the old filename, and destination, i.e., the new filename.

Next, in S220, as part of the first phase, for each session, ransomware detector 140 derives an event feature vector for each event that occurs within a time window. An event feature vector is a vector containing event features, i.e., numerical values, that represent an event. Operationally, the window may be, in various embodiments, a sliding window over the event stream or a series of non-overlapping windows over the event stream.

An event feature vector, sometimes referred to as, an event-level feature vector, may include information that represent, for example, the type of file operation performed, the file path components, and various string metrics. The type of file operation may be, for example, read, write, modify, move, and delete. The path components designate the particular file undergoing the file operation and include at least the file's name. The string metrics are numeric metrics that are a function of one or more strings of the event.

More specifically, numeric features are derived for each event in a sequence of events and the numeric features for each event are put into a respective event feature vector that characterizes that event. The event feature vectors are grouped in a set such that each event feature vector in the set represents an event in a sequence of events that took place in the time window. Given that there is one vector in the set for each event that took place during the time window there can be many event feature vectors in the set for the time window.

The numbers of the numeric features employed as various event-level features that may be used in the event level vectors may be derived by, for example:

1) generating metrics of strings of path components, such as total character count of the path or the count of specific characters in the path.

2) comparing path components of the previous filename to path components of the new filename for move events and deriving a number indicative of a characteristic of the comparison result.

Note that wherever the comparing strings of is mentioned for feature creation that such may involve exact or fuzzy string matching, as well as the calculation of similarity scores between strings. The basis for the similarity scores may include Jaccard similarity, Jaro, Jaro-Winkler, or Levenshtein distance. The similarity score may then be used as the particular feature.

3) generating rolling event features. In this regard, certain event features are derived not only from the current event but may be derived based on more than one event in a sliding window. These may be referred to as rolling features. As one example, continuous features may be calculated from the event stream for each session through rolling functions such as, for example, rolling mean, standard deviation, and rolling-window Shannon entropy. Such event features may be assigned to an event at the discretion of the implementer. For example, the first event of the window may be assigned the rolling value. In another example, the last event of the window may be assigned the rolling value.

4) comparing path components in a moving window of two or more consecutive events. This may include comparing the depth of the directory portion of the path, to identify recursive tree-traversal behavior, e.g., by using a normalized depth change metric where a negative value indicates a predominantly upward traversal, i.e., moving toward the root, while a positive value indicates a predominantly downward traversal, i.e., moving deeper into subdirectories, and a value close to 0 indicates a more balanced traversal of the directory tree.

5) counting unique or recurring instances of path components or substrings of path components across events, which may be performed employing fuzziness or exactness.

6) developing file age metrics, e.g., the time since the creation time, the last access time, or the last modification time of files that were referenced in each event.

7) counting failed file operations, e.g., due to "permission denied" errors.

8) processing one or more already developed features using numeric techniques such as normalization.

9) creating derived numeric features by employing numeric operators, such as subtraction or division, on one or more of the already developed features.

10) converting categorical features, e.g., operation type, to numeric features by using techniques such as one-hot encoding. As is well-known, a categorical feature is a type of data that can be one of multiple categories, e.g., file extension, but lacks any quantitative relationship or order between them, e.g., the file extensions are arbitrary. One-hot encoding is a process of converting categorical features into a binary format that can be understood by machine learning algorithms. Each unique category value is represented by a binary vector where all the elements are zero, except for one, which is marked as one. This 'one' corresponds to the presence of a specific category. For example, if we have three categories, e.g., apple, banana, and cherry, one-hot encoding would represent apple as [1, 0, 0], banana as [0, 1, 0], and cherry as [0, 0, 1]. This method allows machine learning algorithms to handle categorical data.

The ransomware detector 140 in some embodiments, operates in a batch processing mode while in other embodiments it operates in a stream processing mode. In the batch processing mode, ransomware detector 140 processes the entire event stream periodically, for instance, once every 5 seconds, using a sliding window, for example with a window size of 120 seconds, to analyze the data. In the stream processing mode, ransomware detector 140 continuously analyzes the event stream in real-time as events are received from the audit log provider 150.

With the development of the set of event feature vectors the first phase of the process is completed and then the second phase of the process begins in S230.

In S230, ransomware detector 140 derives a file-level feature vector for every unique file that is indicated within the event-level feature vectors. This may be done by grouping the event-level feature vectors by at least one unique identifier of a file, for example, by filename, and derives a file-level feature vector for every unique file that is indicated within the event-level feature vectors. Note that, as indicated above, a filename as used in this application may include the path. When the path is included in the filename, each filename is unique. Thus, for each group, where each group contains event-level feature vectors that pertain to a single particular file, a single vector is developed which can be considered to be a compressed representation or a summary of the events for that file so that in the end there is one vector per path, and hence for each unique file. As such, the features of the file-level feature vectors may include indications of aggregations of the event-level feature vectors, counts of events that were logged for each file, and derived numeric features utilizing numeric operators. Such numeric operations may be any mathematical formula such as, the ratio between two features; the sum of two features; the square root of a feature; and so on.

In certain embodiments grouping the events by file path and name further requires tracking the identity of files by using a stable file identifier that persists across move and delete operations. Doing so resolves a potential problem that separate file-level vectors will result for the same file, e.g., one vector before and one vector after the file was moved or renamed. However, if a stable identifier, such as an inode number, is employed, then it is recognized that there is only a single file even when the filename has changed. Similarly, when a file is deleted and a new file is created with the same name, if only the filename is employed the two distinct files will be considered to be the same file while using a stable file identifier that persists across move and delete operations will allow the deleted and the newly created files to be treated as two separate files. Thus, the file-level features are calculated as a single group even if the file was moved, and if a file is deleted and then a new one is created with the same name, they are considered two separate files. Advantageously, this enhances the resilience of ransomware detector 140 to strains of malware that employ unusual chains of operations in order to evade detection.

In addition to grouping the event-level feature vectors, other file-level features may be developed for each file having an event during the time window and such file-level features are incorporated into the file-level feature vectors. Some file-level features that may be used according to this disclosure include, but are not limited to:

1) Aggregations on the event level features for events that apply to a specific file, such as maximum, minimum, sum, median or mean.

2) Counts of events that were logged for each file, such as move, delete, or write.

3) Numeric features derived by utilizing numeric operators, such as subtraction or division, on one or more features.

4) Numeric features derived by conversion of categorical features using techniques like one-hot encoding.

5) Features derived not only from events for the file in the current time window but rather based on more than one event for the file in a sliding window. Such features may be developed by, for example, deriving continuous features on the files operated upon in each session through rolling functions like rolling mean, rolling median, rolling standard deviation, or rolling window Shannon entropy.

It should be noted that in one embodiment, one or more of the file-level features are calculated after sorting the files, for example, by filename. By calculating the lag features on files in a sorted order rather than by the original event timestamps, the invention reduces the effectiveness of malware that uses temporal techniques to manipulate the timing of events, thereby masking its behavior and evading detection.

Thereafter, in S240, ransomware detector 140 employs a classifier model, such as an ensemble of trees, a gradient boosting model, or a neural network, on the set of file-level numeric feature vectors to predict a risk score for each file. The predicted risk score is indicative of the likelihood of the file being associated with ransomware activity, e.g., the file has been affected by ransomware activity.

The classifier model is trained on a large dataset of file events that are labelled as either malicious or safe, e.g., using supervised learning, and it is used to classify files based on their risk score. Generally, the model is trained on a set of labeled data. The model learns to predict the output for new data points by finding patterns in the labeled data. The labels for the instant disclosure are set in advance and label particular portions of the training data as ransomware while other portions are labeled as not ransomware.

More specifically, the training dataset used to train the classifier model is best to be a training dataset that consists of both positive and negative samples. The positive samples are event logs that contain ransomware behaviors, while the negative samples are event logs that do not contain such behaviors.

In one embodiment, the negative data used for training is obtained independently of server 130. Thus, the model is trained not based on data of the specific server 130 on which it is running but from another source, and so the model may be considered to be a generic model.

In another embodiment, the negative data employs baseline event logs collected from server 130 located at the customer's premises in addition to other servers. Including baseline event logs from the server 130 enables the model to adapt to the typical access patterns of the users of server 130, thus enhancing its ability to distinguish between the baseline, typical day-to-day events and anomalous patterns. In other words, a custom model is created taking into account the data actually processed by server 130. As a result, advantageously, the present disclosure provides an enhanced capability for detecting and preventing ransomware attacks in diverse user environments.

This baseline training process can be conducted during an initial training period following the deployment of ransomware detector 140 or ransomware detector 140 may be retrained periodically with new data collected from server 130 so as to enable ransomware detector 140 to adapt to changing access patterns. Doing so ensures that the model remains current in view of changing user access patterns thus enabling it to continue to provide accurate and reliable detection while minimizing false positive detections.

In another embodiment, a generic model is employed initially but the event logs are from server 130 during system operation to fine-tune or train the model if the detection accuracy is deemed inadequate, such inadequacy being determined based on human feedback.

In another embodiment, the original generic classifier model is not modified for fine tuning and instead a second model is trained to operate on the file-level features and on the scores calculated by the first model. The output of the first model is supplied to the second model which is trained to predict the error of the first model and correct the results thereof. In other words, the second model is trained to minimize the error between the predicted score of the first model and the actual feedback provided by users or administrators. This approach enables the system to continuously improve its accuracy and effectiveness, while also maintaining the integrity of the original generic classifier model.

In one embodiment, the classifier is a binary classifier that develops a risk score for each file and then files with a risk score that exceed a certain threshold, for example 0.99, the file feature vector, which represents the operation performed on the file, is classified as malicious, while all other file feature vectors are classified as safe.

In another embodiment, the classifier is a multiclass classifier, which enables differentiating between different attack types or ransomware families and further may provide various additional information such as which specific ransomware family was detected to a system administrator. The multiclass classifier returns multiple risk scores where each returned risk score is reflective of the events corresponding to a particular known families of ransomware or attack tactics. In this regard, a ransomware family refers to a group or category of ransomware that shares similar characteristics, features, or code, with the result being that members of the family have a similar behavior.

In S240, a risk score is calculated for each session based on the predicted risk scores of the files associated with the session, i.e., which were predicted in step S240. To this end, the risk scores of each file that was predicted in S230 are aggregated for the session in the time window.

Lastly upon identifying a session whose risk score is above a prescribed threshold, ransomware detector 140 initiates an incident handling process. Such incident handling processes may include generating an alert, quarantining the user corresponding to the session having a risk score above the threshold, suspending operations by the user corresponding to the session having a risk score above the threshold, and requiring a multi-factor authentication, biometric verification, captcha, or an alternative method of re-authentication for the suspicious user, and notifying relevant personnel. In this regard, suspending is blocking access entirely while quarantining may allow continued access but with some limitations such as imposing some rate limit or allowing read-only access. Requiring additional authentication for the suspicious user increases the confidence that the session whose risk score is above a prescribed threshold is not ransomware when the user supplies the required authentication.

The process then returns to S210 to process the next time window.

As an illustrative example, consider the following record of file events in a time window shown in Table 1.

TABLE 1

| Session | Operation | Path | Destination Path |
| --- | --- | --- | --- |
| a | Write | /a/file1.txt | |
| b | Write | /a/file2.doc | |
| a | Delete | /a/file1.txt | |
| b | Delete | /a/file2.doc | |
| b | Move | /a/file2.doc | /a/file3.doc |
| b | Delete | /a/file3.doc | |

After these events are grouped by session in S210, the result of which is shown in Table 2:

TABLE 2

| Session | Operation | Path | Destination Path |
| --- | --- | --- | --- |
| a | Write | /a/file1.txt | |
| a | Delete | /a/file1.txt | |
| b | Write | /a/file2.doc | |
| b | Delete | /a/file2.doc | |
| b | Move | /a/file2.doc | /a/file3.doc |
| b | Delete | /a/file3.doc | |

In S220, event level features are derived, and the result is shown in Table

TABLE 3

| Session | Operation | Path | Destination Path | FeatureA1 | FeatureA2 |
| --- | --- | --- | --- | --- | --- |
| a | Write | /a/file1.txt | | 0.23 | −1.23 |
| a | Delete | /a/file1.txt | | 0.42 | 2.01 |
| b | Write | /a/file2.doc | | −2.01 | −1.23 |
| b | Delete | /a/file2.doc | | 2.30 | −2.01 |
| b | Move | /a/file2.doc | /a/file3.doc | 1.23 | 2.30 |
| b | Delete | /a/file3.doc | | −0.96 | 0.42 |

In S230, file-level features are derived which are shown in Table 4.

TABLE 4

| Session | Path | Feature1 | FeatureB2 | FeatureB3 | FeatureB4 |
| --- | --- | --- | --- | --- | --- |
| a | /a/file1.txt | 8.23 | 8.23 | −1.213 | −1.213 |
| b | /a/file2.doc | −2.01 | −2.01 | −1.23 | −1.23 |
| b | /a/file3.doc | −0.96 | −0.96 | 50.42 | 50.42 |

In S240, a risk score is predicted for each file, as shown in Table 5.

TABLE 5

| Session | Path | Risk score |
| --- | --- | --- |
| a | /a/file1.txt | 0.001 |
| b | /a/file2.doc | 0.96 |
| b | /a/file3.doc | 0.98 |

In S250, the per-session risk score is calculated, as shown in Table 6. In one embodiment, the risk score for a session is calculated for each session by aggregating the risk scores of files classified as malicious in that session. In another embodiment, the risk score for a session is calculated by counting the number of malicious files in the session within a specified time window.

TABLE 6

| Session | Risk score |
| --- | --- |
| a | 0.01 |
| b | 0.97 |

In step S260, an incident handling action is Initiated for a session when a risk score for that session is above a threshold. To achieve this, each session risk score is compared against a threshold value. For example, such a threshold value may be 0.95. In instances where the risk score of a session is less than or equal to the threshold, no security incident is detected, and consequently, no action is initiated. However, when the risk score of a session is greater than the threshold, an incident handling action is Initiated for that session. For example, the risk score of session a is less than the illustrative threshold value of 0.95, and hence no action is initiated for session a. By contrast, the risk score of session b exceeds the illustrative threshold value of 0.95 and, therefore, the system identifies a security incident, and an incident handling action is initiated, e.g., blocking the user associated with session b, e.g., from further access to the system. Note that if the risk score for a session surpasses the threshold, the session is considered to be malicious.

In an embodiment, as part of the incident handling action, an automated recovery process that rolls back changes to files that were recently modified by the attacker may be initiated as well. This helps to minimize the potential impact of the attack on the user.

Upon identifying a malicious session, a log message that includes information such as user identification, Internet Protocol (IP) address, timestamp, and confidence level, along with possibly additional forensic data on the incident, may be generated by ransomware detector 140. This log message may be used to conduct further analysis of an identified attack which may aid in implementing appropriate remedial measures, e.g., as part of the incident handling. In certain embodiments, the system allows for feedback from administrators following an investigation of an incident. This feedback may indicate whether the attack was confirmed or was found to be a false positive. In one embodiment, the classifier model is then fine-tuned based on this feedback, utilizing techniques such as active learning or reinforcement learning, to improve the accuracy of future predictions.

Furthermore, upon identifying a malicious session, ransomware detector 140 may generate a notification that is transmitted to management system 160. The notification may contain relevant details of the detection, including information about the detected suspicious activity, e.g., details about the malicious behavior, and a forensic evidence file containing a subset of the file access log that was classified as containing malicious behavior. The file access log is a log in which is stored a record of the file operations performed, which may be by legitimate users or ransomware.

Audit log provider 150 may furnish a sequential event stream for file events. Every event typically includes a sequentially increasing event identifier or timestamp, a user identifier of the user who executed the action, the network address of the user, the types of operation carried out, e.g., create, write, delete, or move, the complete file path, and, for file move operations, the destination path. In one embodiment, the file events are filtered, e.g., so as to record only a solitary write per file, even if several write events occurred for the file.

It has been noted that some types of ransomware operate by creating new files with different filenames and then deleting the original files, rather than moving existing files. For example, a ransomware may add a suffix to the filename or otherwise change the filename so that the original file and the file as encrypted by the ransomware have a similar, but different filename. Therefore, it can be difficult for a ransomware detection module to establish a direct causal link between the creation of encrypted files and the deletion of original files, due to the divergence in filenames. To overcome this challenge, an embodiment of the disclosure computes numeric features to use in events by measuring the similarity between different filenames occurring within a time window. The similarity can be based on various factors, including identifying filenames that differ only by suffix or utilizing string distance functions such as Hamming distance.

One illustrative such similarity that may be employed by the machine learning model as part of the process for the detection of ransomware is the existence pairs of filenames where a first filename for a file which has a suffix, which may also be referred to the file extension, e.g., f1.extension has a file f2 occurring within the time window, where the name of f2 is identical to the filename f1 other than the extension of filename f1 having been removed from the file name of f2. For example, where f1.extension is the filename of f1, the filename of f2 would simply be f1.

In view of the foregoing, the following numerical features may be defined. At the discretion of the implementer, these features can be computed for each event within the event-level feature vector or for each file within the file-level feature vector.

A) An 'is_paired' feature: When a pair of filenames is found during the time window that differ only by one file having an extension and the other not having an extension, the is_paired feature is set to 1, thus indicating that a pair of matching filenames but for the elimination of the extension has been found. For example, if filename f1.extension and f1 are found in the time window, e.g., for files f1 and f2 above, is_paired is set to 1 indicating a matching pair of filenames has been found. When no such matching pairs are found, the 'is_paired' feature value is set to 0.

B) A 'nosuffix_before_suffix' feature: This feature is set to 1 when the filename without the suffix appear prior in time to the filename with the suffix. Thus, for example, when the filename for f2, i.e., f1, appears earlier in time to the filename for f1, i.e., f1.extension, nosuffix_before_suffix will be set to 1. Note, too, that since there has been found a matching pair of filenames with and without the suffix, is_paired will also be set to 1. Otherwise, i.e., if no matching pairs are found or the filename with the suffix appears in time prior to the filename without the suffix, nosuffix_before_suffix is set to 0.

C) A 'suffix_before_nosuffix': feature: This feature is set to 1 when the filename with the suffix appears prior in time to the filename without the suffix. Thus, for example, when the filename for f1, i.e., f1.extension, appears earlier in time to the filename for f2, i.e., f1, nosuffix_before_suffix will be set to 1. Note, too, that since there has been found a matching pair of filenames with and without the suffix, is_paired will also be set to 1. Otherwise, i.e., if no matching pairs are found or the filename with the suffix appears later in time than the filename without the suffix, nosuffix_before_suffix is set to 0.

Note that although the foregoing is described in terms of removal of a suffix, those of ordinary skill in the art will readily recognize that removal of any character or characters, or another type of string transformation, may be performed in lieu of, or in addition to, removal of a suffix.

Those of ordinary skill in the art will be able to develop additional such features. e.g., features based on the time sequence of specific operations executed on at least one of the paired filed. For example, features based on the writing of f1 subsequent to a movement of f2, the deletion of f1 following the writing of f2, and so on.

In one embodiment, a hash function may be employed to expedite the search for pairs of similar filenames, for example, those for which is_paired should be set to 1.

To this end, first, a hash vector, h1, is generated by computing a hash value for each full filename, inclusive of the file extension. This vector lists the hash of every filename in the order of its occurrence within the time window with its extension, if any, thereby preserving the temporal sequence of the events, e.g., each time a new file name appears in the time window the index for each filename is increased by one and the filename is stored at the indexed location in the vector.

Second, another hash vector, h2, is produced in a similar manner as for h1 but where the filenames are hashed without their suffix. Thus, vector h2 lists the hash of every filename but without its extension, if any, in the order of its occurrence within the time window, thereby preserving the temporal sequence of the events, e.g., each time a new file name appears in the time window the index for each filename is increased by one and the filename is stored at the indexed location in the vector. Indeed, vector h2, although it may have different values, has the same temporal sequence as does h1, given that both vectors have an entry for every filename that appeared during the time windows.

Third, an intersection operation is performed for the hash vectors h1 and h2 to identify identical hash values in each vector, which indicates files that have filenames that are the same other than with regard to any extension. Typically, this indicates linked files.

Fourth, two new vectors, v1 and v2 are constructed based on the results of the intersection operation. Vector v1 contains the indexes for h1 where files in the intersection are found, i.e., files for which is_paired is 1, are found, while vector v2 contains the indexes from h2 for the files of the intersection.

Table 7 shows an example of vectors h1 and h2 and their indices. The first column of Table 7, provided for pedagogical purposes, is the index, i.e., the respective position in the table for each entry, which corresponds to the position in the vector. The second column of Table 7 contains the values of vector h1, which is the vector generated by computing a hash value for each full filename, inclusive of any file extension. Thus, in the example shown in Table 7, there are 4 filenames that appeared in the time window and the hash values for their file names including their extension, if any, in the order that they appeared in the time window are listed in the second column of Table 7. The third column of Table 7 contains the values of vector h2, which is the vector generated by computing a hash value for each full filename, exclusive of any file extension. Thus, in the example shown in Table 7, there are 4 filenames that appeared in the time window and the hash values for their file names in the order that they appeared in the time window but exclusive of any extension are listed in the third column of Table 7.

TABLE 7

| Index | vector h1 (hash including suffix) | vector h2 (hash of suffix removed) |
|---|---|---|
| 0 | 100 | 500 |
| 1 | 300 | 200 |
| 2 | 200 | 600 |
| 3 | 400 | 100 |

As can be seen, the hash value 100 is found at index 0 in h1 and at index 3 in h2 while the hash value 200 appears at index 2 in h1 and at index 1 in h2. Thus, the result of the intersection operation is {100, 200}. Consequently, applying the results of the intersection operation to construct vectors v1 and v2 results in:

v1={0, 2} v2={3, 1}

The is_paired feature is easily derived based the vectors v1 and v2, the 'is_paired'. This is because every index listed in vectors v1 and v2 represents a pair of filenames where one is identical to the other, except for possibly the addition of a suffix. Therefore, the 'is_paired' feature is assigned the value of '1' for the file events at indices 0, 1, 2, and 3.

Furthermore, the 'nosuffix_before_suffix' and 'suffix_before_nosuffix' features may also be determined based on vectors v1 and v2. The suffix_before_nosuffix' feature is set to 1 when the value of an index in vector v1 is less than the value of the positionally corresponding index in vector v2, indicating that the file name with the suffix occurred before the filename without the suffix. Otherwise, it is set to 0. In the above example, the suffix_before_nosuffix feature is set to 1 for indices 0 and 3.

Conversely, the nosuffix_before_suffix feature is set to 1 when the value of an index in vector v1 is greater than the value of the positionally corresponding index in vector v2, indicating that the file name with the suffix occurred after the filename without the suffix. Otherwise, it is set to 0. In the above example, the nosuffix_before_suffix feature is set to 1 for indices 1 and 2.

Server 130 may, in some embodiments, be a file server or a network-attached storage (NAS). However, those of ordinary skill in the art will readily recognize that the principles of this disclosure may apply more broadly, e.g., to any computing device having a filesystem, to any object storage system, or to any other storage device with files that can be accessed and manipulated.

Figure 3:
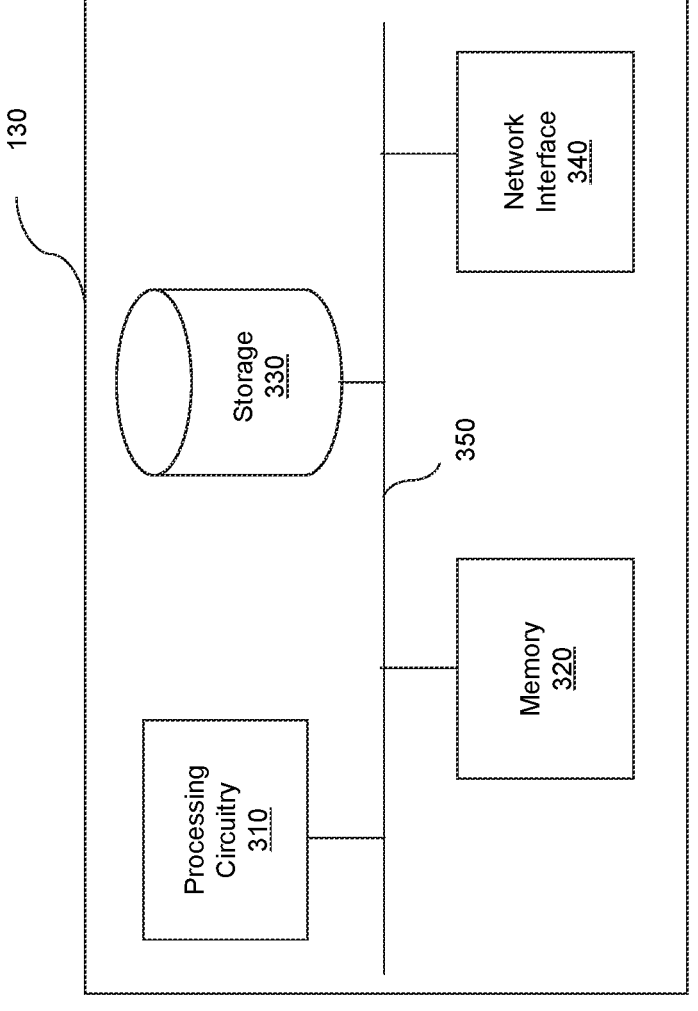
FIG. 3 is an example schematic diagram of a system that could be used to implement the ransomware detector of FIG. 1.

FIG. 3 is an example schematic diagram of a system 300 according to an embodiment that could be used to implement ransomware detector 140. The system 300 includes a processing circuitry 310 coupled to a memory 320, a storage 330, and a network interface 340. In an embodiment, the components of the system 130 may be communicatively connected via a bus 350.

The processing circuitry 310 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 320 may be volatile, e.g., random access memory, etc., no-volatile, e.g., read only memory, flash memory, etc., or a combination thereof.

In one configuration, software for implementing one or more embodiments disclosed herein may be stored in the storage 330. In another configuration, the memory 320 is configured to store such software. Software shall be construed broadly to mean any type of instructions, whether referred to as software, firmware, middleware, microcode, hardware description language, or otherwise. Instructions may include code, e.g., in source code format, binary code format, executable code format, or any other suitable format of code. The instructions, when executed by the processing circuitry 310, cause the processing circuitry 310 to perform the various processes described herein.

The storage 330 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 340 allows the system 300 to communicate with, for example, a wireless tag. In this regard, network interface 340 may include one or more wireless transceiver circuits and appropriate antennas.

It should be understood that the embodiments described herein are not limited to the specific architecture illustrated in FIG. 3, and other architectures may be equally used without departing from the scope of the disclosed embodiments.

System 300 may be implemented in whole or in part as a virtual machine.

The various embodiments disclosed herein can be implemented as hardware, firmware, firmware executing on hardware, software, software executing on hardware, or any combination thereof. Moreover, the software is implemented tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be implemented as either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for protecting against malware that performs file operations at a server computer in a system having a client computer and the server computer, the client computer causing file operations to be performed at the server computer, comprising:
   gathering, by the server computer, information for each file operation performed at the server computer into an event, the gathered information including, at least an identifier of a file on which the file operation was performed and a type of the file operation performed on the file at the server computer;
   developing, not by the client computer, an event-level feature vector for each event, each of the event-level feature vectors including at least two features, each of the features in each of the event-level feature vectors being numerical data representing an aspect of the gathered information for each event;
   grouping the event-level feature vectors by at least one identifier of a file and deriving a file-level feature vector for every unique file that is indicated within the event-level feature vectors;
   supplying, not by the client computer, the file-level feature vectors to a trained machine learning classifier and receiving as an output of the classifier at least one risk score, each risk score indicating a likelihood of a presence of malware activity; and
   when there is a likelihood of malware activity being present which is indicated by an aggregate risk score exceeding a threshold, the aggregate risk score being based on the at least one risk score output by the classifier, initiating incident handling.

2. The method of claim 1, wherein the events are determined from metadata regarding file operations indicated by the events without requiring access to data in each respective file that is represented in each corresponding event.

3. The method of claim 1, wherein the developing further comprises:
   grouping events as they are received by session, wherein each session corresponds to each unique user of the server computer, and wherein time sequence ordering of the events of each session is preserved.

4. The method of claim 1, wherein the derivation of a file-level feature vector further includes performing aggregations of the event-level features.

5. The method of claim 1, at least one of the event-level feature vector and the file-level feature vector includes at least one feature that is generated based on multiple events within a sliding time.

6. The method of claim 1, further comprising adding at least one file-level feature to each file-level feature vector, the added at least one file-level feature being developed separately from the event-level feature vectors that are grouped.

7. The method of claim 1, wherein the type of file operation includes at least one of write, move, and delete, and wherein the identifier of the file includes a filename.

8. The method of claim 7, wherein for a move file operation, the gathered information additionally comprises a destination filename.

9. The method of claim 1, wherein the numerical data employed as at least one of the at least two features is based on string metrics of at least one of the identifier of the file, a destination filename for the file, and a combination of both the identifier of the file and the destination filename.

10. The method of claim 1, at least one of the event-level feature vector and the file-level feature vector includes at least one feature that is generated based on multiple filenames within a sliding time window.

11. The method of claim 10, further comprising identifying, within the sliding time window, at least one pair of files that have identical filenames after removal of at least one character that is part of a filename of one of the files prior to its removal.

12. The method of claim 11, further comprising deriving hash vectors based on the filenames within a time window and identifying the pairs of files based on an intersection between the hash vectors.

13. The method of claim 12, wherein a first of the hash vectors is based on hashing of filenames in the time window in their entirety and a second of the hash vectors is based on hashing of the filenames with at least one character removed.

14. The method of claim 1, wherein the trained machine classifier is executed by the server computer.

15. The method of claim 1, wherein the trained machine classifier is executed in a cloud environment.

16. The method of claim 1, wherein incident handling includes at least one of: quarantining a user, requiring additional authentication from a user, and initiating a rollback procedure.

17. An arrangement for protecting against malware that performs file operations at a server computer in a system having a client computer and the server computer, the client computer causing file operations to be performed at the server computer, wherein the server computer gathers information for each file operation performed at the server computer into an event, the gathered information including, at least an identifier of a file on which the file operation was performed and a type of the file operation performed on the file at the server computer, comprising:
   a processing circuitry; and
   a memory, the memory containing instructions that, when executed by the processing circuitry, configure the system to:
   develop an event-level feature vector for each event, each of the event-level feature vectors including at least two features, each of the features in each of the event-level feature vectors being numerical data representing an aspect of the gathered information for each event;

group the event-level feature vectors by at least one identifier of a file and derive a file-level feature vector for every unique file that is indicated within the event-level feature vectors;

supply the file-level feature vectors to a trained machine learning classifier and receiving as an output of the classifier at least one risk score, each risk score indicating a likelihood of a presence of malware activity; and when there is a likelihood of malware activity being present which is indicated by an aggregate risk score exceeding a threshold, the aggregate risk score being based on the at least one risk score output by the classifier, initiate incident handling.

18. A non-transitory computer readable medium having stored thereon instructions for causing a processing circuitry to perform a process for protecting against malware that performs file operations at a server computer in a system having a client computer and the server computer, the client computer causing file operations to be performed at the server computer, wherein the server computer gathers information for each file operation performed at the server computer into an event, the gathered information including, at least an identifier of a file on which the file operation was performed and a type of the file operation performed on the file at the server computer, the process comprising:

developing, not by the client computer, an event-level feature vector for each event, each of the event-level feature vectors including at least two features, each of the features in each of the event-level feature vectors being numerical data representing an aspect of the gathered information for each event;

grouping the event-level feature vectors by at least one identifier of a file and deriving a file-level feature vector for every unique file that is indicated within the event-level feature vectors;

supplying, not by the client computer, the file-level feature vectors to a trained machine learning classifier and receiving as an output of the classifier at least one risk score, each risk score indicating a likelihood of a presence of malware activity; and when there is a likelihood of malware activity being present which is indicated by an aggregate risk score exceeding a threshold, the aggregate risk score being based on the at least one risk score output by the classifier, initiating incident handling.

* * * * *